United States Patent [19]

Chang

[11] Patent Number: 5,123,296
[45] Date of Patent: Jun. 23, 1992

[54] BREAK LEVER FOR A BICYCLE

[76] Inventor: Huang-San Chang, No. 451, Ta-Tien Rd., Nan-Tien Li, Ho-Mei Chen, Chang-Hua Hsien, Taiwan

[21] Appl. No.: 662,200

[22] Filed: Feb. 28, 1991

[51] Int. Cl.⁵ .................................. F16C 1/10
[52] U.S. Cl. ...................... 74/502.2; 74/489; 74/558; 74/558.5; 74/551.8
[58] Field of Search .............. 74/502.2, 489, 551.8, 74/557, 558 X, 558.5

[56] References Cited

U.S. PATENT DOCUMENTS

| | | | |
|---|---|---|---|
| 3,071,023 | 1/1963 | Herr et al. | 74/558.5 |
| 3,176,536 | 4/1965 | Altenburger | 74/489 |
| 3,803,941 | 4/1974 | Yoshikawa | 74/489 X |
| 3,998,109 | 12/1976 | O'Brien | 74/558 X |
| 4,644,816 | 2/1987 | Cockburn | 74/502.2 |
| 4,852,423 | 8/1989 | Mikami et al. | 74/558 X |
| 4,893,519 | 1/1990 | Corso et al. | 74/558.5 X |
| 4,903,799 | 2/1990 | Romano | 74/502.2 X |
| 4,991,461 | 2/1991 | Sennett et al. | 74/558.5 X |

Primary Examiner—Leslie A. Braun
Assistant Examiner—Matthew W. Stavish
Attorney, Agent, or Firm—Morton J. Rosenberg; David I. Klein

[57] ABSTRACT

A brake lever connected to a brake system of a bicycle includes a metal arm having a pivoted end connected to the brake system and a handle portion with a distal end. A rigid plastic coating layer fully covers the handle portion, the coating layer having a first thick portion adjacent to the pivoted end, and a thin portion. A shoulder is formed between the thick and thin portions. A flexible plastic coating layer covers the thin portion and is flush with the thick portion of the rigid plastic coating layer.

9 Claims, 6 Drawing Sheets

BREAK LEVER FOR A BICYCLE

FIELD OF THE INVENTION

This invention relates to a brake lever, more particularly to a brake lever which is connected to a brake system of a bicycle. This brake lever is solidly assembled, can be manufactured at low cost, is comfortable to grasp, and has different colors and designs as desired.

DESCRIPTION OF RELATED ART

Referring to FIG. 1, a first conventional brake lever 1 has a metal arm with a handle portion 3, a plurality of projections 7 projecting from the surface of the handle portion 3, and a flexible rubber sleeve 8. The sleeve 8 is manually sleeved on the handle portion 3 so the quality is often poor and the assembly of the brake lever 1 takes a lot of time and effort, resulting in a high cost of manufacturing. The sleeve 8 is made of flexible rubber so the sleeve 8 is liable to detach from the handle portion 3 as the rubber gradually loses its elasticity.

Referring to FIG. 2, a second conventional brake lever has a metal arm 2 with a handle portion 21. The handle portion 21 has a plurality of through holes 22. A flexible rubber coating layer 23 covers the handle portion 21. The cover layer 23 is ordinarily thin, so the rider can easily feel the metal handle portion 21 present beneath the rubber. Thus, the brake lever is uncomfortable to grasp. Furthermore, the sleeve 8 and the cover layer 23 are monotonously colored and lack variety.

SUMMARY OF THE INVENTION

Therefore, the object of this invention is to provide a brake lever for a bicycle which is solidly assembled, is low manufacturing cost, is comfortable to grasp, and has different colors and designs as desired.

Accordingly, a brake lever of this invention is connected to a brake system of a bicycle and includes a metal arm which has a pivoted end connected to the brake system and a handle portion with a distal end. A rigid plastic coating layer fully covers the handle portion, the coating layer having a thick portion adjacent to the pivoted end, and a thin portion. A shoulder is formed between the thick and thin portions. The thin portion has a roughened surface. A flexible plastic coating layer fully covers the thin portion. The flexible plastic coating layer can be flush with the thick portion of the rigid plastic coating layer.

BRIEF DESCRIPTION OF THE DRAWINGS

Other features and advantages of this invention will become apparent in the following detailed description of the preferred embodiment with reference to the accompanying drawings, of which:

FIG. 8 (B) is a schematic view of the neck portion of the brake lever formed by the rigid plastic coating layer, wherein the surface of the neck portion is roughened by a plurality of teeth.

FIG. 8 (C) is a schematic view of the neck portion of the brake lever formed by the rigid plastic coating layer, wherein the surface of the neck portion is roughened by a plurality of alternating cylindrical protrusions and recesses.

FIG. 8 (D) is a schematic view of the neck portion of the brake lever formed by the rigid plastic coating layer, wherein the surface of the neck portion is roughened by a plurality of longitudinal strip protrusions.

FIG. 8 (E) is a schematic view of the neck portion of the brake lever formed by the rigid plastic coating layer, wherein the surface of the neck portion is roughened by a plurality of longitudinal and transverse strip protrusions.

DETAILED DESCRIPTION OF THE PREFERRED EMBODIMENT

Figure 1:
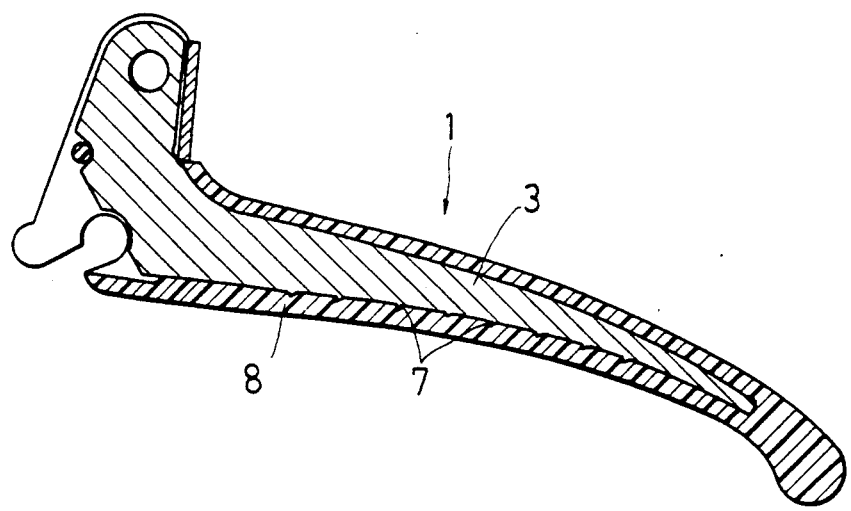
FIG. 1 is a sectional view of a first conventional brake lever of a bicycle.
Figure 2:
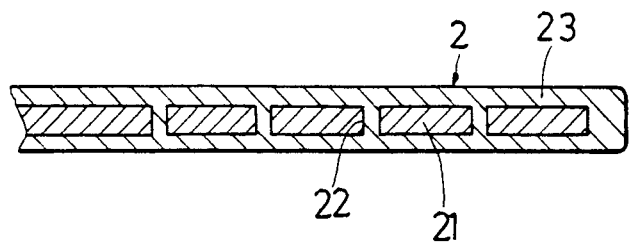
FIG. 2 is a sectional view of a handle portion of a metal arm of a second conventional brake lever for a bicycle.
Figure 3:
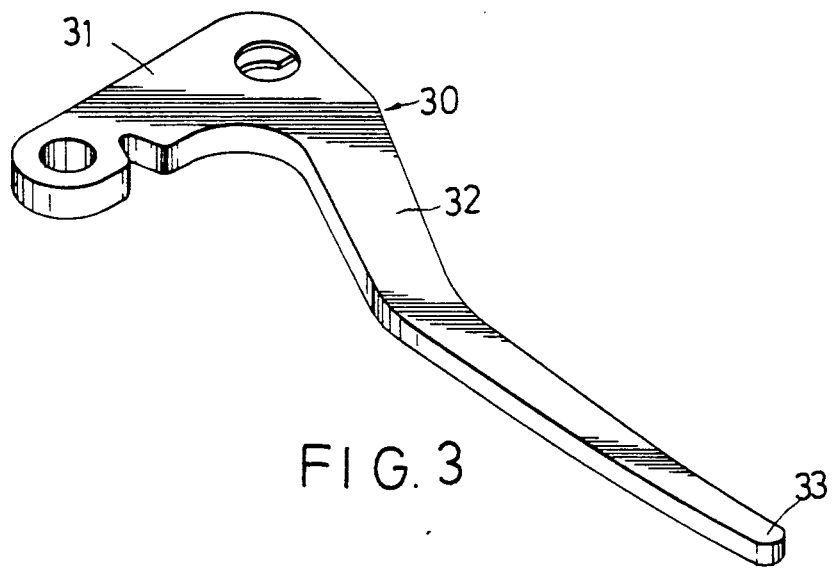
FIG. 3 is a perspective view of a metal arm of a preferred embodiment of a brake lever for a bicycle.
Figure 4:
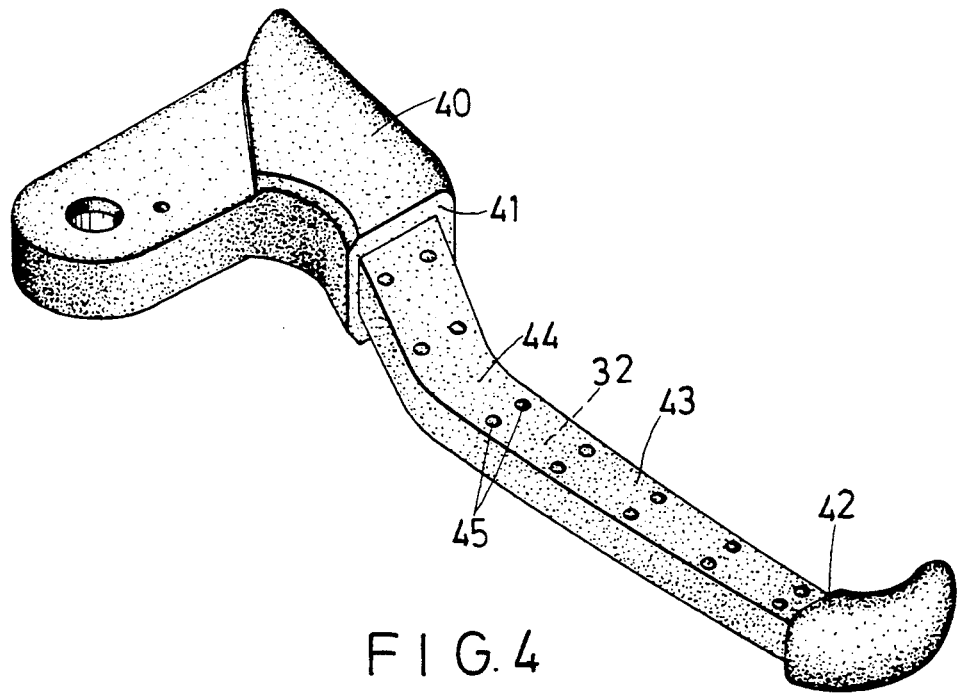
FIG. 4 is a perspective schematic view of a rigid plastic coating layer on the metal arm of the preferred embodiment of the brake lever shown in FIG. 3.
Figure 5:
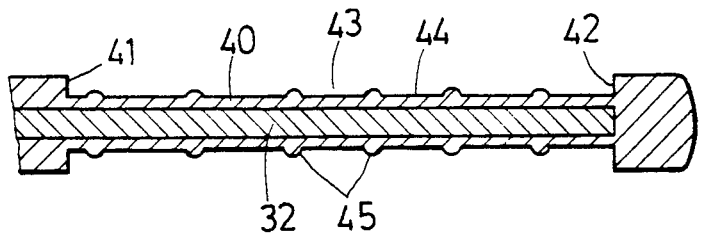
FIG. 5 is a sectional view of the handle portion of the brake lever shown in FIG. 4.
Figure 6:
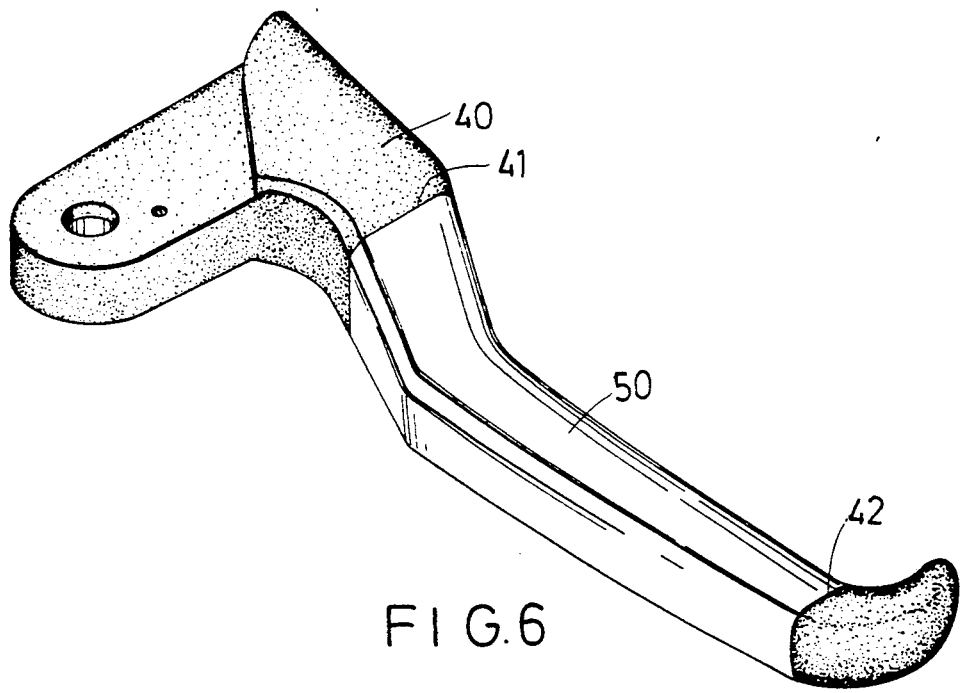
FIG. 6 is a perspective schematic view of the brake lever shown in FIG. 4, having a flexible plastic coating layer.
Figure 7:
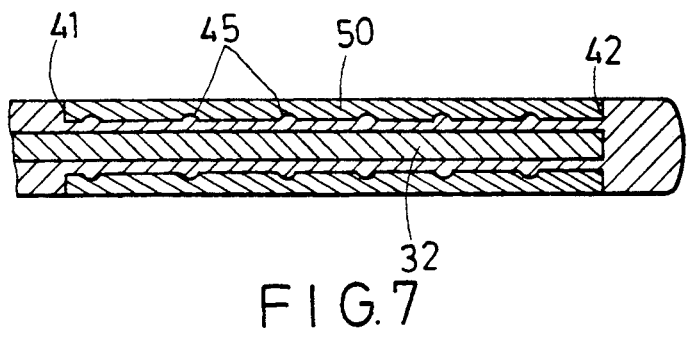
FIG. 7 is a sectional view of the handle portion of the brake lever shown in FIG. 6.
Figure 8A:
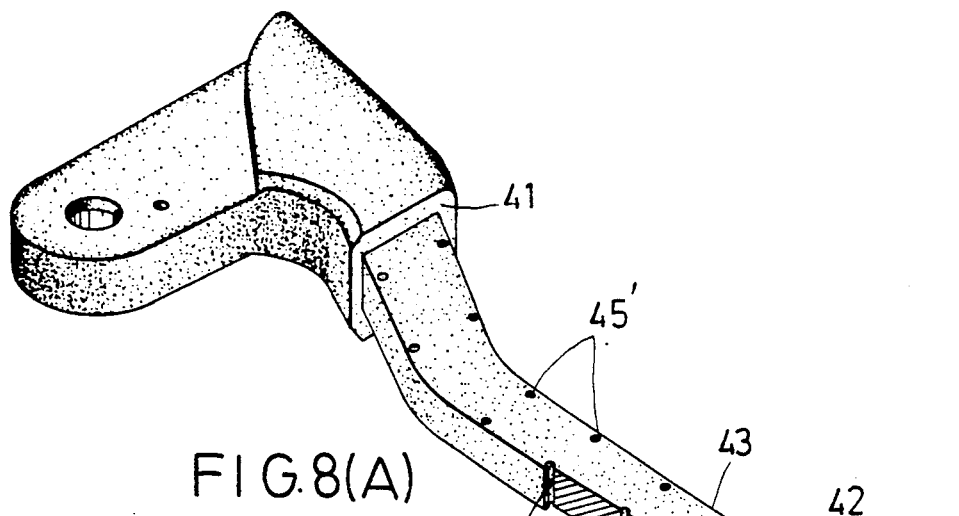
FIG. 8 (A) is a schematic view of the neck portion of the brake lever formed by the rigid plastic coating layer, showing that the surface of the neck portion is roughened by the presence of a plurality of holes.
Figure 8B:
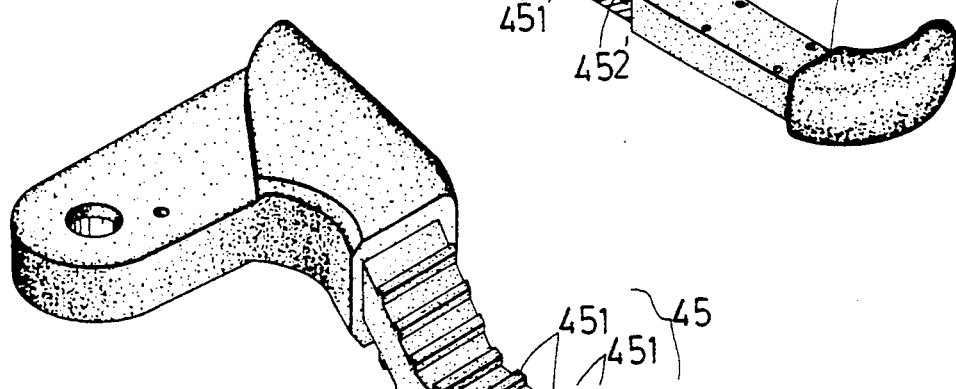
Figure 8C:
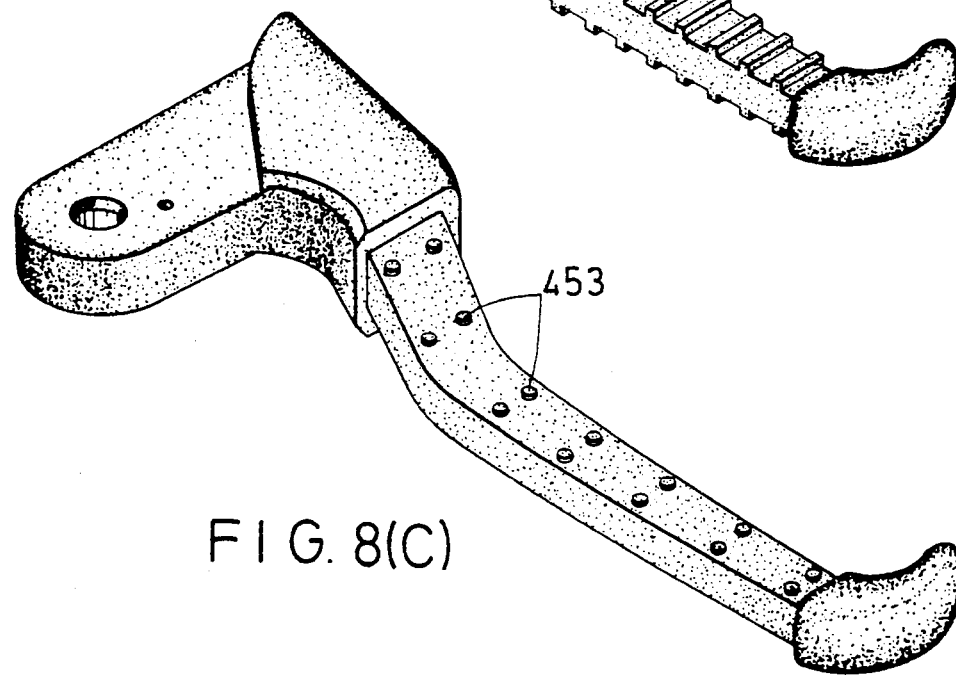
Figure 8D:
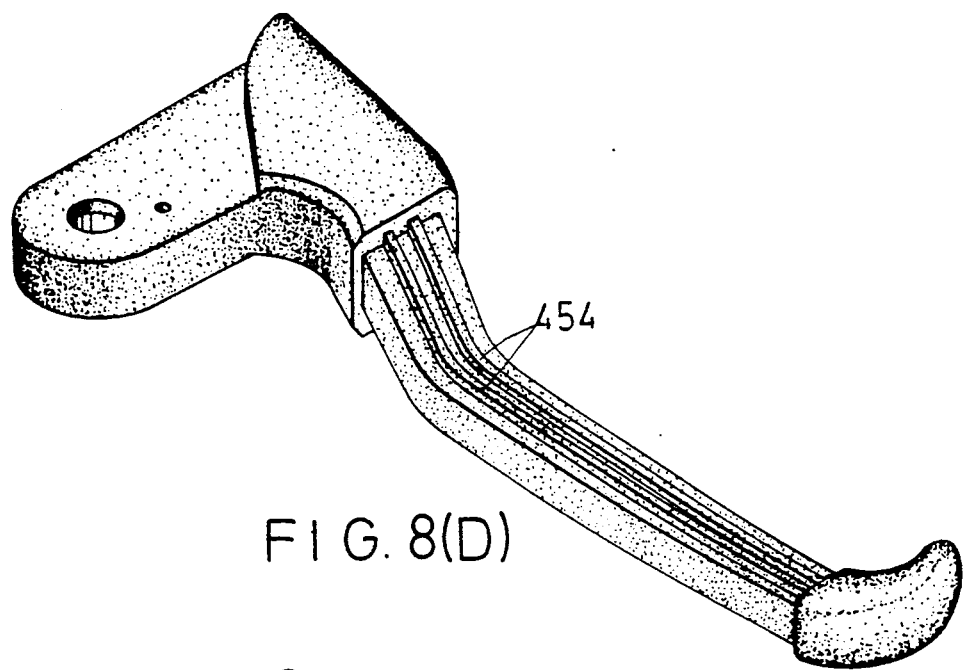
Figure 8E:
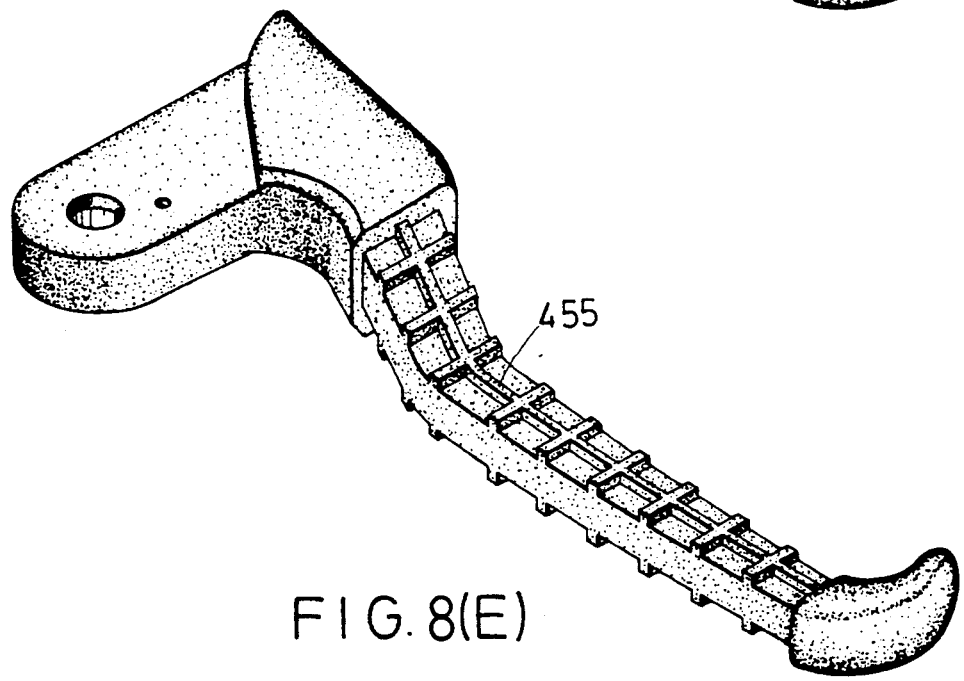

Referring to FIGS. 3-7, a brake lever of this invention to be connected to a brake system includes a metal arm 30, a rigid plastic coating layer 40, and a flexible plastic coating layer 50. The metal arm 30 has a pivoted end 31 connected to the brake system, and a handle portion 32 with a distal end 33. The rigid plastic coating layer 40 is made of polyamide and fully covers the metal arm 30. The coating layer 40 has a first thick portion 41 adjacent to the pivoted end 31 and a second thick portion 42 on the distal end 33. The first and second thick portions 41 and 42 form two opposite shoulders which define a neck portion 43 therebetween. The neck portion 43 has a roughened surface 44 with a plurality of protrusions 45. Referring to FIG. 8 (A), the surface 44 of the neck portion 43 can be roughened by a plurality of through holes 451' or holes 452'. Referring to FIGS. 8 (B)-8 (E), the surface 44 can be roughened by a plurality of teeth 451, alternating cylindrical protrusions and recesses 453, longitudinal strip protrusions 454, or longitudinal and transverse strip protrusions 455. The flexible plastic coating layer 50 is made of polypropylene, polyvinyl chloride or polyurethane. The coating layer 50 fully covers the neck portion 43 and is flush with the thick portions 41 and 42 of the coating layer 40.

Figure 9:
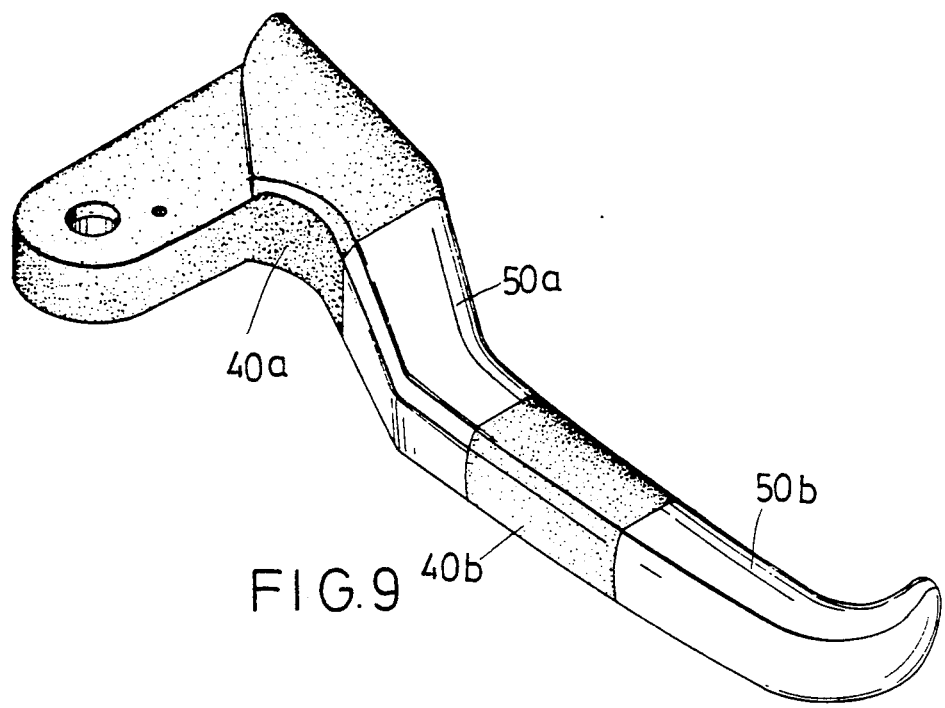
FIG. 9 is a perspective schematic view of a second embodiment of the brake lever of this invention.

Referring to FIG. 9, a second brake lever is similar to the first brake lever described above. The second brake lever has a first thick portion 40a of rigid plastic adjacent to the pivoted end, a second thick portion 40b of rigid plastic formed between the first thick portion 40a and the distal end, and two separate thin portions of rigid plastic fully covered with flexible plastic layers 50a and 50b. The flexible plastic coating 50a and 50b are respectively flush with the rigid plastic layers 40a and 40b.

Figure 10:
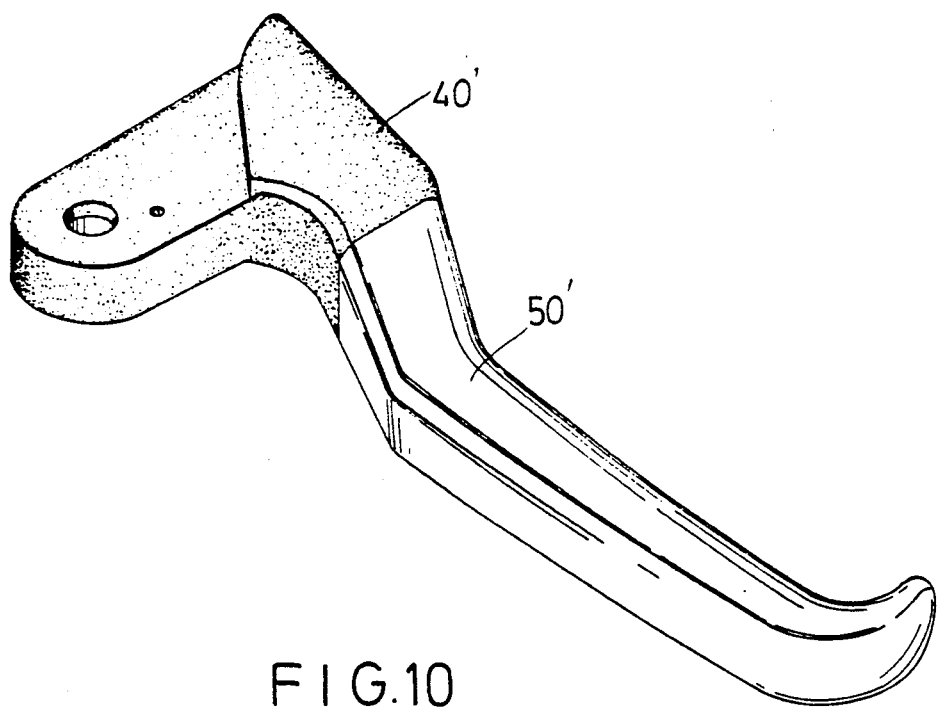
FIG. 10 is a perspective schematic view of a third embodiment of the brake lever of this invention.

Referring to FIG. 10, a third brake lever is also similar to the first brake lever. The third brake lever has a thick portion of rigid plastic 40' and a thin portion of the same covered with flexible plastic 50' which is flush with the thick portion 40'.

The rigid plastic coating layers and the flexible plastic coating layers can be any desired colors, and can have decorative designs thereon.

Therefore, the brake lever is solidly assembled, the coating layers can not detach from the metal arm, and the brake lever is comfortable to grasp. The brake lever can be made entirely by machines so it is high quality, the production is large, and the manufacturing cost is low. Further, since the rigid plastic coating layer and the flexible plastic coating layer have any desired colors and decorative designs, so the brake lever is attractive.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A metal brake lever comprising:
a metal arm member having a pivoted end section and a distal end section, said metal arm member defining a handle section intermediate said pivoted and distal end sections of said metal arm member; said distal end section and a portion of said handle section being coated with a rigid plastic coating having a first predetermined thickness, a remaining portion of said handle section being coated with a rigid plastic coating having a second predetermined thickness, said first and second predetermined thickness coatings defining shoulder portions, said second predetermined thickness coating having a plurality of protrusions extending from an outer surface thereof, said second predetermined thickness coating being further coated with a flexible plastic coating for defining a continuous handle surface devoid of substantial discontinuities.

2. The metal brake lever as recited in claim 1 where said first predetermined thickness of said rigid plastic coating is greater than said second predetermined thickness of said rigid plastic coating.

3. The metal brake lever as recited in claim 2 where said flexible plastic coating is formed over said protrusions for providing positional stabilization of said flexible plastic coating.

4. The metal brake lever as recited in claim 2 where said handle section coated with said rigid plastic coating is positionally located adjacent said pivoted end of said metal arm member.

5. The metal brake lever as recited in claim 2 where said handle section coated with said rigid plastic coating is substantially intermediate said pivoted and distal end sections.

6. A brake lever as claimed in claim 1, wherein said rigid plastic coating layer is made of polyamide.

7. A brake lever as claimed in claim 1, wherein said flexible plastic coating layer is made of polypropylene.

8. A brake lever as claimed in claim 1, wherein said flexible plastic coating layer is made of polyvinyl chloride.

9. A brake lever as claimed in claim 1, wherein said flexible plastic coating layer is made of polyurethane.

* * * * *